(12) United States Patent
Kuze

(10) Patent No.: US 6,719,024 B2
(45) Date of Patent: Apr. 13, 2004

(54) PNEUMATIC TIRE HAVING SIPES

(75) Inventor: Tetsuya Kuze, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 09/931,008

(22) Filed: Aug. 17, 2001

(65) Prior Publication Data

US 2002/0043318 A1 Apr. 18, 2002

(30) Foreign Application Priority Data

Aug. 24, 2000 (JP) ........................ 2000-253391

(51) Int. Cl.$^7$ .................. B60C 1/00; B60C 11/00; B60C 11/12
(52) U.S. Cl. ................ 152/209.4; 152/209.7; 152/209.15; 152/209.21; 152/209.23; 152/902; 152/DIG. 3
(58) Field of Search ............... 152/209.4, 209.7, 152/209.21, 209.23, 902, DIG. 3, 209.15

(56) References Cited

U.S. PATENT DOCUMENTS

| | | | | |
|---|---|---|---|---|
| 4,566,514 A | * | 1/1986 | Mauk et al. | |
| 5,176,765 A | * | 1/1993 | Yamaguchi et al. | |
| 5,350,001 A | * | 9/1994 | Beckmann et al. | |
| 5,776,991 A | * | 7/1998 | Teratani | |
| 5,783,002 A | * | 7/1998 | Lagnier | |
| 6,058,994 A | * | 5/2000 | Amino et al. | |
| 6,336,487 B1 | * | 1/2002 | Teratani et al. | |
| 6,427,737 B1 | * | 8/2002 | Katayama | |
| 2002/0053383 A1 | * | 5/2002 | Kleinhoff et al. | |

FOREIGN PATENT DOCUMENTS

| | | | |
|---|---|---|---|
| EP | 664230 | * | 7/1995 |
| EP | 933235 | * | 8/1999 |
| EP | 963864 | * | 12/1999 |
| JP | 6-48123 | * | 2/1994 |
| JP | 9-323510 | * | 12/1997 |

* cited by examiner

Primary Examiner—Steven D. Maki
(74) Attorney, Agent, or Firm—Rader, Fishman & Grauer PLLC

(57) ABSTRACT

In a pneumatic tire including sipes extending in zigzag provided on tread surfaces, both wall surfaces of each sipe, which face to each other, are inclined with respect to a diameter direction of the tire, constituted of triangular wall surfaces, each having two sides expanding toward a sipe bottom with a bending point of a zigzag of the sipe as an apex and of inverse triangular wall surfaces, each having two sides narrowed toward the sipe bottom with one side of the zigzag of the sipe as a base, and a pair of the triangular wall surfaces adjacent to each other and a pair of the inverse triangular wall surfaces adjacent to each other are alternately arranged. Thus, provided is a pneumatic tire capable of improving ice performance without lowering driving stability on a dry road surface, and of suppressing occurrence of uneven wear.

17 Claims, 2 Drawing Sheets

PNEUMATIC TIRE HAVING SIPES

BACKGROUND OF THE INVENTION

The present invention relates to a pneumatic tire, more specifically, to a pneumatic tire suitable for running on an ice and snow road, which is capable of improving ice performance without lowering driving stability on a dry road surface, and of suppressing occurrence of uneven wear.

Generally, a pneumatic tire used on the ice and snow road is constituted in such a manner that a large number of blocks are defined on a tread surface by main grooves extending in a circumference direction of the tire and side grooves extending in a width direction of the tire, and that sipes are provided on contact surfaces of the blocks. Generally, the sipes extend straight in a depth direction of the tire. A groove area is secured by the main grooves and the side grooves, thus braking and driving performance of the tire on snow (snow performance) is exerted. Meanwhile, braking and driving performance of the tire on ice (ice performance) is secured by edge effects of the blocks and the sipes.

Incidentally, in recent years, a "Mirror Bahn Phenomenon" that a road surface is frozen in a cold district in winter, becomes smooth like a mirror plane and tends to be slippery has frequently occurred, which is one of causes causing a serious accident. Therefore, in the pneumatic tire for the ice and snow road, further improvement for the ice performance has been required.

However, when the number of sipes is simply increased in order to further improve the ice performance, rigidity of the blocks has been lowered, thus the driving stability on the dry road surface has been lowered. Furthermore, there has been a problem that uneven wear occurs.

SUMMARY OF THE INVENTION

The object of the present invention is to provide a pneumatic tire capable of improving ice performance without lowering driving stability on a dry road surface, and of suppressing occurrence of the uneven wear.

The present invention achieving the foregoing object is a pneumatic tire provided with sipes extending in zigzag on tread surfaces, characterized in that both wall surfaces of each of the sipes, the wall surfaces facing to each other, are inclined with respect to a diameter direction of the tire, and constituted of triangular wall surfaces, each having two sides expanding toward a sipe bottom with a bending point of a zigzag of the sipe as an apex and of inverse triangular wall surfaces, each having two sides narrowed toward the sipe bottom with one side of the zigzag of the sipe as a base, and a pair of the triangular wall surfaces adjacent to each other and a pair of the inverse triangular wall surfaces adjacent to each other are alternately arranged.

As described above, the both zigzag wall surfaces of the sipe, which face to each other, are inclined with respect to the diameter direction of the tire. Thus, an area of the entire wall surface of the sipe can be widened more than that of a conventional sipe extending straight in a depth direction of the tire. Accordingly, a contact pressure between the wall surfaces of the sipe contacting with each other during shear deformation of the block and rib formed on a tread surfaces at the time of the braking and driving of the tire can be increased.

Moreover, the both wall surfaces of the sipe, which face to each other, are constituted of triangular wall surfaces, each having two sides expanding toward a sipe bottom with a bending point of a zigzag of the sipe as an apex and of inverse triangular wall surfaces, each having two sides narrowed toward the sipe bottom with one side of the zigzag of the sipe as a base, and a pair of the triangular wall surfaces adjacent to each other and a pair of the inverse triangular wall surfaces adjacent to each other are alternately arranged. Thus, the zigzag wall surfaces of the sipe can be made in contact with each other just by compression and deformation of the block or the rib while allowing forces alternately inverse to act on the zigzag bending portions of the sipe. Accordingly, it is made possible to further increase the contact pressure between the wall surfaces of the sipe, which contact with each other, during the braking and the driving of the tire. Therefore, since the blocks or the ribs can be formed so as to be hard to fall, lowering of the block rigidity due to provision of the sipe is not substantially brought. Accordingly, the driving stability on a dry road surface is not lowered. Moreover, since the rigidity of block or rib is high and not partially varied, it is made possible to suppress the occurrence of the uneven wear.

Accordingly, during the braking and the driving of the tire, it is made possible to increase the number of the sipes while maintaining the rigidity of block or rib, thus the ice performance can be improved by the edge effect of the increased sipes.

BRIEF DESCRIPTION OF DRAWING

FIG. 4(a) is an explanatory view showing a ridge line between triangular wall surfaces projected; and FIG. 4(b) is an explanatory view showing a ridge line between inverse triangular wall surfaces projected.

FIG. 5(a) is a sectional view along a line m—m of FIG. 3; and FIG. 5(b) is a sectional view along a line n—n of FIG. 3.

DETAILED EXPLANATION OF THE PREFERRED EMBODIMENTS

Figure 1:
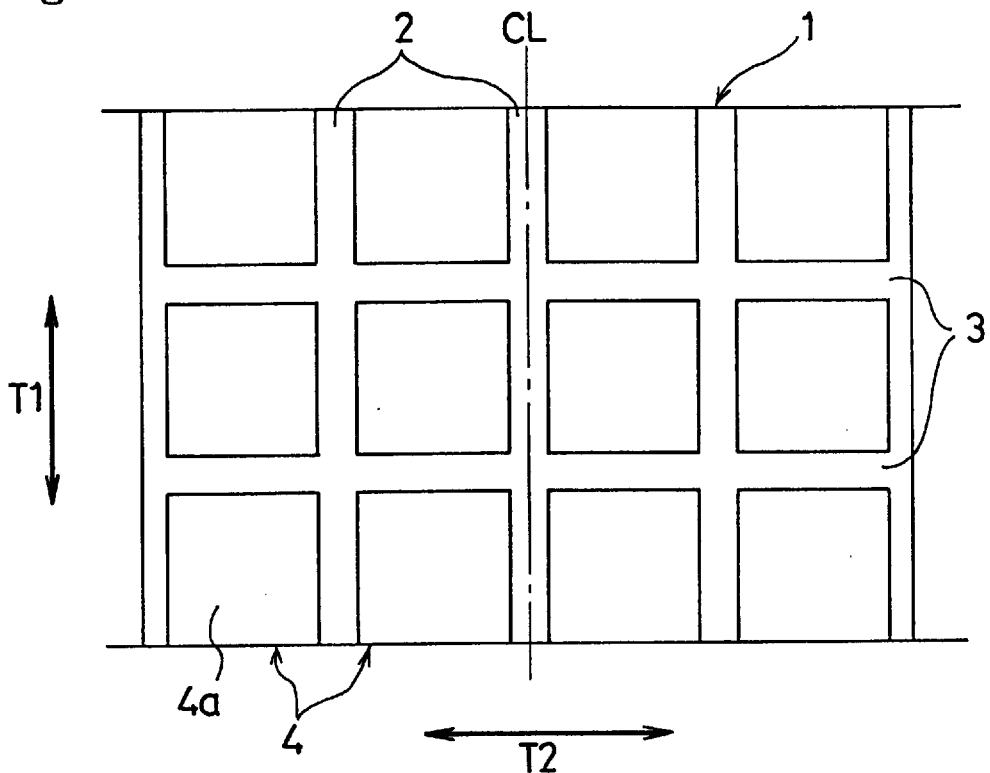
FIG. 1 is a development view showing a principal portion of a tread surface in an example of a pneumatic tire of the present invention.

FIG. 1 shows one example of a pneumatic tire of the present invention. On a tread surface 1, a plurality of main grooves 2 extending in a circumference direction T1 of the tire are provided. And, side grooves 3 extending in a width direction T2 of the tire are provided at a specified pitch in the circumference direction T1 of the tire. A large number of blocks 4 are defined by the main grooves 2 and the side grooves 3. A reference code CL denotes a centerline of the tire.

Figure 2:
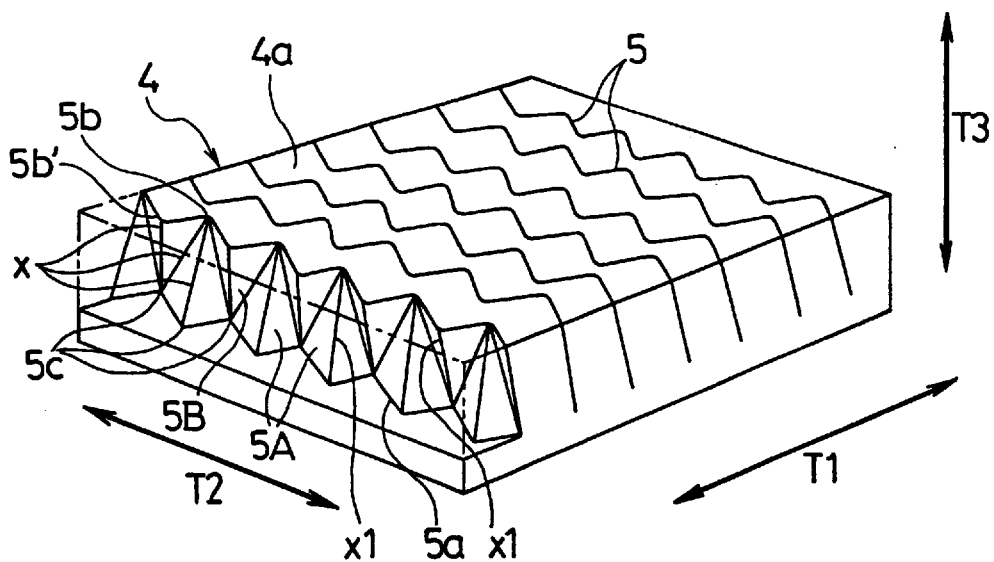
FIG. 2 is a perspective view of a block partially cut away along a sipe.

As shown in FIG. 2, on a contact surface 4a of a block 4, a plurality of sipes 5 extending in zigzag in the width direction T2 of the tire are provided. Each sipe 5 crosses the block 4 and communicates with the right and left main grooves 2.

As shown in FIG. 2, with regard to the sipe 5, a zigzag of a bottom surface 5a is shifted from that of the contact surface 4a by a half pitch in the width direction of the tire (direction where the sipe extends), both zigzags having an equal amplitude. Both wall surfaces facing to each other in the sipe 5 are partitioned by ridge lines x. In this case, among four ridge lines each, three ridge lines x each connect one bending point 5b of the zigzag of the contact surface 4a with three bending points 5c of the zigzag of the bottom surface 5a, and the other ridge line x connects the other bending point 5b' with one bending point 5c. Each of the wall surface is inclined with respect to a diameter direction T3 of the tire. Moreover, the wall surface is constituted of triangular wall surfaces 5A and inverse triangular wall surfaces 5B. In this case, in each triangular wall surface 5A, two sides expand toward the sipe bottom with the bending point of the zigzag of the contact surface 4a of the sipe 5 as an apex. And in each inverse triangular wall surface 5B, two sides are narrowed toward the sipe bottom with one side of the zigzag of the contact surface 4a of the sipe 5 as a base. The triangular wall surfaces 5A and the inverse triangular wall surfaces 5B are arranged alternately so that a pair of the triangular wall surfaces 5A and a pair of the triangular wall surfaces 5B can be adjacent to each other. Ridge lines x1 where the wall surfaces 5A and 5A (5B and 5B) of the pairs are close to each other are located on a same cross-section in the circumference direction of the tire.

Figure 3:
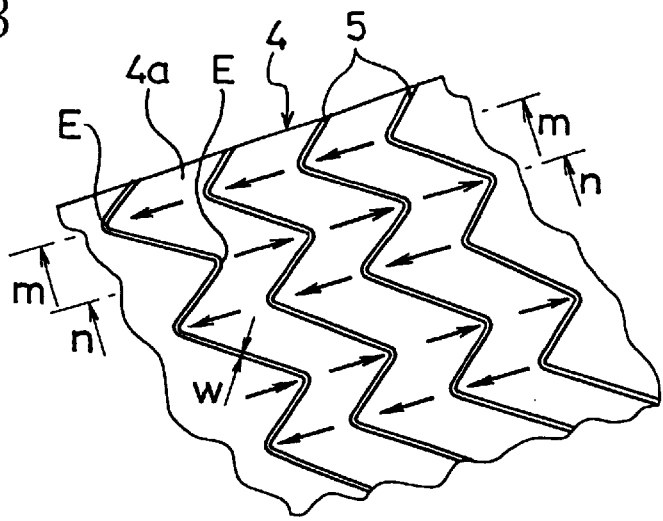
FIG. 3 is an explanatory view for an action of sipes in the block of FIG. 2.

As described above, the both wall surfaces facing to each other in the sipe 5 are inclined with respect to the circumference direction T3 of the tire. Each wall surface is constituted of the triangular wall surfaces 5A, each having two sides expanding toward the sipe bottom with the bending point of the zigzag of the sipe as an apex, and of the inverse triangular wall surfaces 5B, each having two sides narrowed toward the sipe bottom with one side of the zigzag of the sipe as a base. For each pair of wall surfaces adjacent to each other, the triangular wall surfaces 5A and the inverse triangular wall surfaces 5B are alternately arranged. Therefore, the area of the entire wall surface of the sipe 5 can be increased as compared with that of a conventional sipe extending straight in the depth direction of the tire. Accordingly, when the block 4 is subjected to shear deformation during braking and driving of the tire, a contact pressure between the wall surfaces in contact with each other is increased more than conventional, and the block 4 becomes hard to fall. In addition, as shown in FIG. 3, just by compression and deformation of the block 4, forces in directions shown by arrows act on the bending portions of the zigzags of the sipes 5 so as to be alternately inverse, thus contacting the wall surfaces of each sipe 5 with each other. Accordingly, the contact pressure between the wall surfaces of the sipe 5, which contact with each other during the braking and the driving of the tire, can be further increased, thus enabling the falling of the block 4 to be further suppressed.

Therefore, since the blocks can be formed so as to be hard to fall, the lowering of the block rigidity due to provision of the sipes is not substantially brought. Accordingly, the driving stability on a dry road surface is not lowered. Moreover, since the block rigidity is high and not partially varied, it is made possible to suppress the occurrence of the uneven wear.

Accordingly, during the braking and the driving of the tire, a large number of the sipes 5 can be provided on the block 4 while maintaining the block rigidity, thus it is made possible to improve the ice performance by the edge effect of the increased sipes.

Figure 4A:
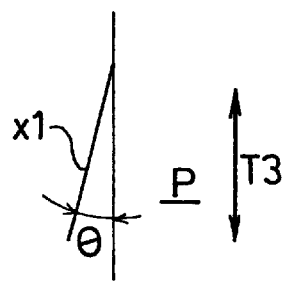
FIGS. 4(a) and 4(b) are views showing inclinations of ridge lines of wall surfaces of the sipes.
Figure 4B:
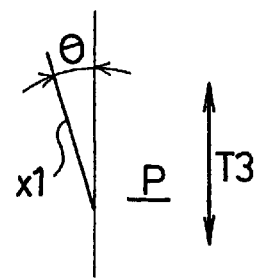

In the present invention, as shown in FIGS. 4(a) and 4(b), when the ridge line x1 where the pair of adjacent wall surfaces are close to each other is projected on a plane P perpendicular to the direction where the sipe 5 extends in zigzag in the width direction of the tire, an inclination angle θ of the ridge line x1 with respect to the diameter direction of the tire is preferably set in a range of 10 to 35°. FIG. 4(a) shows the case of the ridge line x1 between the pair of triangular wall surfaces 5A, and FIG. 4(b) shows the case of the ridge line x1 between the pair of inverse triangular wall surfaces 5B. When the inclination angle θ is smaller than 10°, it is difficult to effectively suppress the above-described falling of the block 4. Conversely, when the inclination angle θ exceeds 35°, in the case where a green tire (raw tire) is put into a mold to be vulcanized there, it is difficult to release the tire from the mold after it is vulcanized. If the tire is released therefrom by force, deformation of the sipe shape (bending of the sipe) occurs.

A thickness (width) w of the sipe 5 is preferably set at 0.5 mm or less. When the thickness w exceeds 0.5 mm, an interval between the both wall surfaces is widened too much to lower the contact pressure between the wall surfaces when they are in contact with each other. As a result, it is difficult to effectively suppress the falling of the block 4. A lower limit of the thickness w is preferably set at 0.2 mm.

Figure 5A:
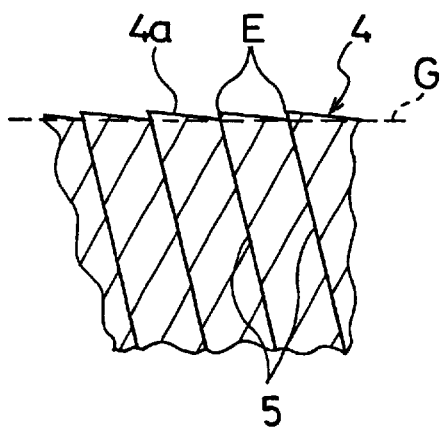
FIGS. 5(a) and 5(b) are views showing examples where gas-filled thermoplastic resin particles are used for rubber compositions constituting the tread surfaces.
Figure 5B:
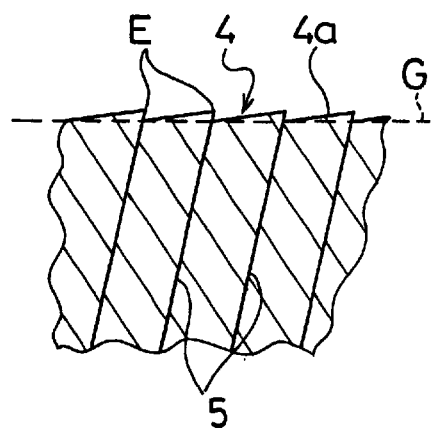

The tread contact surface 1 is preferably formed of a rubber composition containing gas-filled thermoplastic resin particles, each having a true specific gravity of 0.1 or less and a particle diameter ranging from 5 to 300 $\mu$m. A lower limit of the true specific gravity is not particularly limited as long as it may be larger than 0. These gas-filled thermoplastic resin particles have elasticity and are formed, for example, in the following manner as disclosed in Japanese patent application Kokai publication No. 11-35736. Specifically, thermally expansional thermoplastic resin particles filled with a liquid or a solid evaporated, decomposed or chemically reacted by heat to generate a gas are thermally expanded during rubber vulcanization to be made hollow, thus forming the gas-filled thermoplastic resin particles. When the tread surface 1 is formed of the rubber composition with the particles thus formed, the particles are thermally expanded during the tire vulcanization. Accordingly, in the tire after the vulcanization, as shown in FIGS. 5(a) and 5(b), one edge E of each sipe 5 of the block 4 protrudes to a ground contact surface G. Consequently, the ground contact pressure of the tire during load application is increased, thus enabling the ice performance to be improved. FIG. 5(a) is a sectional view along a line m—m of FIG. 3; and FIG. 5(b) is a sectional view along a line n—n of FIG. 3

In the embodiment described above, the example where the sipes 5 are provided in the width direction of the tire has been described. However, the present invention is not limited to this example, and sipes extending in the circumference direction of the tire and in a direction slant with respect thereto may be provided.

Also, while the invention has been described in the above in connection with such an example in which blocks are formed on the tread surface, the invention is not limited to this only, and the invention can be applied to rib tires in which ribs are formed by a plurality of main grooves extending in the tire circumferential direction and also to such pneumatic tires in which both blocks and ribs are formed on the tread surface.

Hereinbelow, the present invention will be further described with reference to examples.

EXAMPLE 1 AND COMPARATIVE EXAMPLE 1

Two types of tires were prepared, each type having a tire size of 185/65 R 14 and a tread pattern of FIG. 1. As tires of the present invention (example 1), ones in which the sipes shown in FIG. 2 were provided were prepared. As the conventional tires (comparative example), ones in which the zigzag sipes extending straight in the depth direction of the tire were provided were prepared. In each tire of the present invention, the inclination angle θ of the ridge line x1 of the wall surfaces of the sipe is 20°. In both of the example 1 and the comparative example, the thickness w of the sipe is 0.4 mm.

Four test tires of each example were mounted onto rims with a rim size of 14×6JJ, and air with a pressure of 200 kPa was filled therein. Then, the tires were mounted onto a Japanese FF vehicle with an exhaust capacity of 1800 cc, and evaluation tests for the ice performance thereof were executed under measuring conditions described below. Table 1 shows results thus obtained.

Ice Performance

In an ice-covered test course with an ice temperature ranging from −5° C. to −8° C. and an air temperature ranging from −3° C. to −5° C., straight braking distances when braking was performed from a speed of 40 km/h were measured, and results of the measurement were evaluated indexed to the conventional tire as 100. The larger these index values are, the shorter the braking distances are and the more excellent the ice performance is.

TABLE 1

|  | Example 1 | Comparative example 1 |
|---|---|---|
| Ice performance | 120 | 100 |

As apparent from Table 1, the tire of the present invention can improve the ice performance.

EXAMPLES 2 TO 9

With reference to the tire of the present invention in the example 1, as shown in Table 2, tires of examples 2 to 9 were prepared, in which the inclination angle θ and the thickness w of the sipe were varied. Note that, in the example 9, the foregoing gas-filled thermoplastic resin particles were used for the rubber composition forming the tread contact surface.

Evaluation tests about the ice performance were performed for the test tires similarly to the example 1, and results shown in Table 2 were obtained. In the example 6, since the inclination angle θ is too large, the bending of the sipe occurs.

From Table 2, it is understood that the inclination angle θ of the ridge line x1 of the wall surfaces of the sipe should be set in a range of 10 to 35° and the sipe thickness w should be set at 0.5 mm or lower.

What is claimed is:

1. A pneumatic tire having at least a first sipe and a second sipe extending on tread surfaces in zigzag and in a width direction of the tire independently of each other and spaced apart from one another to define a zigzagged block portion therebetween having a substantially uniform width disposed between opposing edges of the zigzagged block portion, wherein both wall surfaces of each sipe, the wall surfaces facing to each other, are inclined with respect to a diameter direction of the tire, constituted of triangular wall surfaces, each having two sides expanding toward a sipe bottom with a bending point of a zigzag of the sipe as an apex disposed on a contact surface of the tire and of inverse triangular wall surfaces, each having two sides narrowed toward the sipe bottom with one side of the zigzag of the sipe defining a base bending point disposed on the contact surface of the tire, and a pair of the triangular wall surfaces adjacent to each other and a pair of the inverse triangular wall surfaces adjacent to each other are alternately arranged, the zigzagged block portion having, as viewed in cross section, a first inclined section protruding from a ground contact surface of the tire that inclines outwardly relative to the diameter direction of the tire between consecutive apexes from the at least first sipe to the second sipe and a second inclined section protruding from the ground contact surface of the tire that inclines inwardly relative to the diameter direction of the tire between consecutive base bending points from the at least first sipe to the second sipe.

2. The pneumatic tire according to claim 1, wherein inclination angles Θ of ridge lines with respect to the diameter direction of the tire are set in a range of 10 to 35° when a ridge line where a pair of the triangular wall surfaces are close to each other and a ridge line where a pair of the inverse triangular wall surfaces are close to each other are projected on a plane perpendicular to a direction where the sipes extend in zigzag.

3. The pneumatic tire according to claim 2, wherein the thickness w of the sipes is set in the range of 0.2 to 0.5 mm.

4. The pneumatic tire according to claim 3, wherein said tread surface on which sipes extending in zigzag are provided is block surface.

5. The pneumatic tire according to claim 4, wherein the tread surfaces are formed of a rubber composition containing gas-filled thermoplastic resin particles, each having a true specific gravity of 0.1 or less and the particle diameter ranging from 5 to 300 μm.

6. The pneumatic tire according to claim 3, wherein the tread surfaces are formed of the rubber composition containing the gas-filled thermoplastic resin particles, each having the true specific gravity of 0.1 or less and the particle diameter ranging from 5 to 300 μm.

7. The pneumatic tire according to claim 2, wherein said tread surface on which sipes extending in zigzag are provided is block surface.

8. The pneumatic tire according to claim 7, wherein the tread surfaces are formed of the rubber composition containing the gas-filled thermoplastic resin particles, each having the true specific gravity of 0.1 or less and the particle diameter ranging from 5 to 300 μm.

9. The pneumatic tire according to claim 2, wherein the tread surfaces are formed of the rubber composition containing the gas-filled thermoplastic resin particles, each

TABLE 2

|  | Example 2 | Example 3 | Example 4 | Example 5 | Example 6 | Example 7 | Example 8 | Example 9 |
|---|---|---|---|---|---|---|---|---|
| Inclination angle θ (°) | 5 | 10 | 25 | 35 | 40 | 25 | 25 | 25 |
| Sipe thickness w (mm) | 0.3 | 0.3 | 0.3 | 0.3 | 0.3 | 0.5 | 0.6 | 0.3 |
| Ice performance | 102 | 115 | 125 | 125 | 125 | 115 | 103 | 130 | having the true specific gravity of 0.1 or less and the particle diameter ranging from 5 to 300 μm.

10. The pneumatic tire according to claim 1, wherein a thickness w of the sipes is set in the range of 0.2 to 0.5 mm.

11. The pneumatic tire according to claim 10, wherein said tread surface on which sipes extending in zigzag are provided is block surface.

12. The pneumatic tire according to claim 11, wherein the tread surfaces are formed of the rubber composition containing the gas-filled thermoplastic resin particles, each having the true specific gravity of 0.1 or less and the particle diameter ranging from 5 to 300 μm.

13. The pneumatic tire according to claim 10, wherein the tread surfaces are formed of the rubber composition containing the gas-filled thermoplastic resin particles, each having the true specific gravity of 0.1 or less and the particle diameter ranging from 5 to 300 μm.

14. The pneumatic tire according to claim 1, wherein said tread surface on which sipes extending in zigzag are provided is block surface.

15. The pneumatic tire according to claim 14, wherein the tread surfaces are formed of a rubber composition containing gas-filled thermoplastic resin particles, each having the true specific gravity of 0.1 or less and the particle diameter ranging from 5 to 300 μm.

16. The pneumatic tire according to claim 1, wherein the tread surfaces are formed of a rubber composition containing gas-filled thermoplastic resin particles, each having a true specific gravity of 0.1 or less and a particle diameter ranging from 5 to 300 μm.

17. A pneumatic tire having a plurality of blocks defined on a tread surface by main grooves extending in a circumferential direction of the pneumatic tire and side grooves extending in a width direction of the pneumatic tire, at least one block having at least a first sipe and a second sipe extending on the tread surface of the at least one block in zigzag and in the width direction of the tire independently of each other to communicate with the defining main grooves and spaced apart from one another to define a zigzagged block portion therebetween having a substantially uniform width disposed between opposing edges of the zigzagged block portion, wherein both wall surfaces of each sipe, the wall surfaces facing to each other, are inclined with respect to a diameter direction of the tire, constituted of triangular wall surfaces, each having two sides expanding toward a sipe bottom with a bending point of a zigzag of the sipe as an apex disposed on a contact surface of the tire and of inverse triangular wall surfaces, each having two sides narrowed toward the sipe bottom with one side of the zigzag of the sipe defining a base bending point disposed on the contact surface of the tire, and a pair of the triangular wall surfaces adjacent to each other and a pair of the inverse triangular wall surfaces adjacent to each other are alternately arranged, the zigzagged block portion having, as viewed in cross section, a first inclined section protruding from a ground contact surface of the tire that inclines outwardly relative to the diameter direction of the tire between consecutive apexes from the at least first sipe to the second sipe and a second inclined section protruding from the ground contact surface of the tire that inclines inwardly relative to the diameter direction of the tire between consecutive base bending points from the at least first sipe to the second sipe.

* * * * *